July 1, 1952  G. WINTRISS  2,601,884
ROTARY MACHINE FOR MANUFACTURING SLIDE FASTENERS
Filed Aug. 24, 1946  5 Sheets-Sheet 1

INVENTOR.
George Wintriss
BY
James and Franklin
ATTORNEYS

July 1, 1952 — G. WINTRISS — 2,601,884
ROTARY MACHINE FOR MANUFACTURING SLIDE FASTENERS
Filed Aug. 24, 1946 — 5 Sheets-Sheet 2

INVENTOR.
George Wintriss
BY
James and Franklin
ATTORNEYS

July 1, 1952 G. WINTRISS 2,601,884
ROTARY MACHINE FOR MANUFACTURING SLIDE FASTENERS
Filed Aug. 24, 1946 5 Sheets-Sheet 3

INVENTOR.
George Wintriss
BY
James and Franklin
ATTORNEYS

July 1, 1952  G. WINTRISS  2,601,884
ROTARY MACHINE FOR MANUFACTURING SLIDE FASTENERS
Filed Aug. 24, 1946  5 Sheets-Sheet 4

INVENTOR.
George Wintriss
BY
James and Franklin
ATTORNEYS

July 1, 1952  G. WINTRISS  2,601,884
ROTARY MACHINE FOR MANUFACTURING SLIDE FASTENERS
Filed Aug. 24, 1946  5 Sheets-Sheet 5

INVENTOR.
George Wintriss
BY
James and Franklin
ATTORNEYS

Patented July 1, 1952

2,601,884

UNITED STATES PATENT OFFICE 2,601,884

ROTARY MACHINE FOR MANUFACTURING SLIDE FASTENERS

George Wintriss, Summit, N. J., assignor to Conmar Products Corporation, Newark, N. J., a corporation of New Jersey Application August 24, 1946, Serial No. 692,910

29 Claims. (Cl. 153—1)

This invention relates to the manufacture of slide fasteners.

The primary object of the present invention is to generally improve machines for manufacturing slide fasteners. A more particular object is to provide a smooth, quiet, high-speed machine for severing slide fastener elements or so-called "scoops" from a wire, and to attach the same in properly spaced relation along the beaded edge of a tape.

A still further object is to devise such a machine (often called a "scoop machine") in which all of the mechanical motions are simple rotating motions, all of the moving parts being rotating parts which are driven at uniform speed.

To accomplish the foregoing general objects, and other more specific objects which will hereinafter appear, the present invention resides in the scoop machine elements and their relation one to the other, as are hereinafter more particularly described in the following specification. The specification is accompanied by drawings in which.

Figure 1:
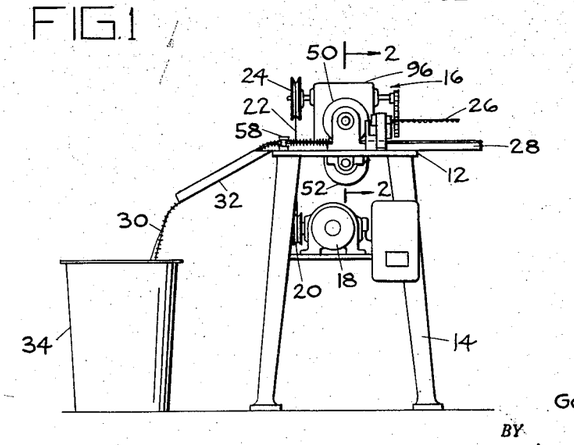
Fig. 1 is an elevation of a scoop machine embodying features of the present invention.

Referring to the drawing, and more particularly to Fig. 1, the complete scoop machine comprises a table 12 supported on legs 14 and carrying a machine head generally designated 16. This is driven by a suitable motor 18 through pulley 20, belt 22 and pulley 24. Scoop wire 26 and tape 28 are fed into the machine, and the finished stringer 30 is discharged through an appropriate trough 32 into a suitable basket or box 34.

Figures 3, 4, 5:
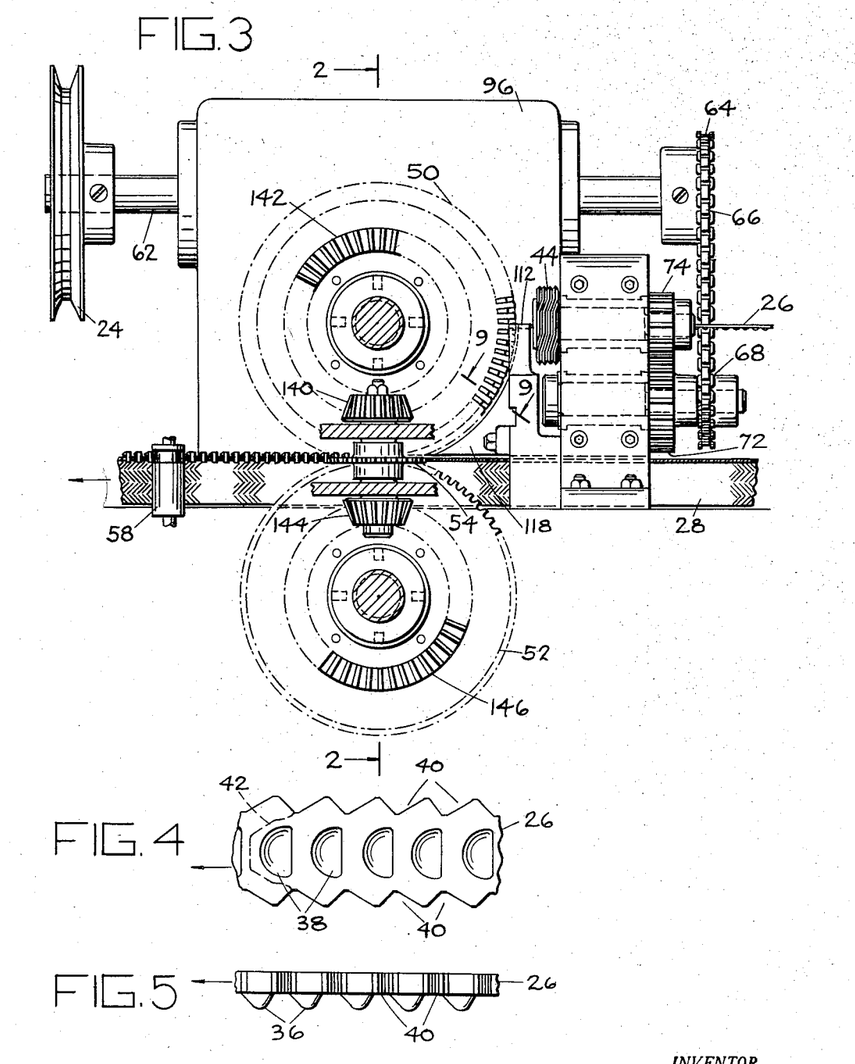
Fig. 3 is a section taken approximately in the plane of the line 3—3 of Fig. 2.
Fig. 4 is a plan view of a fragment of one form of scoop strip or wire which may be used with the present invention.
Fig. 5 is a side elevation thereof.

The particular form of scoop wire here employed is shown in Figs. 4 and 5. The wire is preliminarily coined, as, for example, by means of the roll coining apparatus described in United States Wintriss Patent No. 2,201,068, issued May 14, 1940, and Ulrich Patent No. 2,370,380, issued February 27, 1945. In the particular form of scoop wire here shown, there are a series of projections 36 along one face and a series of recesses 38 along the opposite face. The side edges are serrated as indicated at 40. These serrations correspond to the outer ends of spread jaws, it being understood that the present scoop wire is scrapless, for the head of each embryo scoop is received within the spread jaws of the next preceding embryo scoop. In the present case the serrations 40 are either coined without a fin, or the fin is preliminarily removed in a separate operation, for the scoop machine is not provided with fin removing means.

In the prior patents above referred to, the wire is rolled head first so that it may later be fed to the scoop machine jaw first; but in the present case the wire is preferably rolled jaw first so that it may be fed to the scoop machine head first. This is of minor importance, for even if it were rolled head first, it could be rewound from one reel to another, and then could be fed to the scoop machine head first. If the fin is removed in a wholly separate operation, that would change the direction of scoops. In Figs. 4 and 5 the wire is fed to the scoop machine in the direction indicated by the arrow, and the endmost scoop is severed from the wire on a line such as the broken line 42 shown in Fig. 4, this line defining the outline of the head of one scoop, and the space between the jaws of another scoop.

Considering the machine in greater detail, and referring to Figs. 2, 3, 6 and 14, the apparatus comprises continuously rotatable feed cams 44 and 46 (Fig. 6) engaging the serrated edges of the strip 26, and a continuously rotating severing wheel 50 (Figs. 2, 3 and 14) cooperating with a stationary die 112 (Fig. 3), and slotted to receive and sever the endmost scoop from the strip and to transfer the same to the tape 28. The machine further comprises a continuously rotating stuffing wheel 52 (Figs. 2 and 3) having a circumferentially slit periphery for receiving and supporting the tape between the spread jaws of the scoops.

The machine further comprises continuously rotating clamping wheels 54 and 56 (Figs. 2 and 14) having clamping teeth which mesh with the severing wheel 50 and the stuffing wheel 52, and which engage the spread jaws of the severed scoops to clamp the same against the tape. The severing wheel 50 spaces the scoops at the proper pitch along the tape. There are also continuously rotating auxiliary feed wheels 58 (Fig. 3) engaging the finished stringer to keep the same under tension and to move it at the speed permitted by those scoops already clamped on the tape and still in engagement with the severing wheel. In addition, the machine comprises appropriate gearing interconnecting all of said continuously rotating means in order to rotate the same in properly timed relation.

Figure 6:
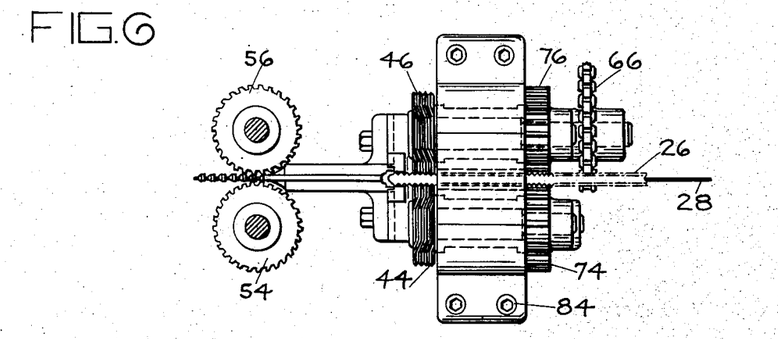
Fig. 6 is a plan view showing some parts of the machine, particularly the feed and clamping mechanisms, with others parts omitted.
Figure 7:
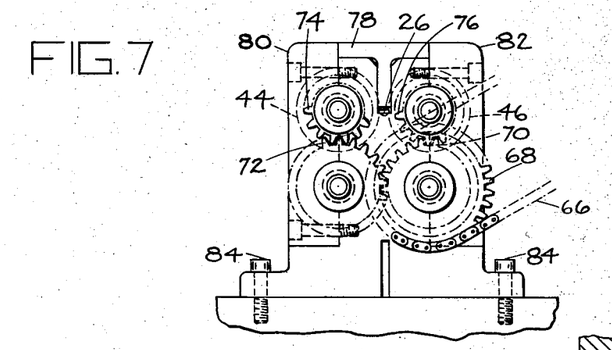
Fig. 7 is an elevation showing the head of the machine, looking from the right in Fig. 3.

The wire feed means may be described with particular reference to Figs. 3, 6 and 7 of the drawings. Each feed cam comprises helical portions which advance the scoop wire 26, and other portions which cause the wire to dwell. These are circumferential or annular, but may for simplicity be called "straight" portions, in contrast with the helical portions. The feed cam rotates continuously, but the wire is moved intermittently. To secure an improved and positive engagement between the feed cams and the wire, the cams are preferably made multiple-track, as is clearly shown in the drawing, so that in addition to having cams on both sides of the wire, each cam engages a plurality of serrations. It will also be noted that there are a plurality of helical and straight cam sections around the periphery of the cam, so that each revolution of the cam causes a plurality of intermittent feed movements of the wire. While this is not essential, it is desirable in order to reduce the otherwise enormous gear reduction ratio between the slow speed severing wheel on the one hand, and the high speed feed cams on the other. In the specific example here shown, the severing wheel has eighty slots, and the cams have four helical portions in one revolution, so that the reduction ratio is one to twenty.

The pulley 24 (previously referred to in connection with Fig. 1 as driven through a belt 22 by a driving motor 18) turns a shaft 62 (Fig. 3), the other end of which carries a sprocket wheel 64 geared by means of a chain 66 and sprocket wheel 68 (Fig. 7) to a gear 70 which meshes with a gear 72. Gear 70 drives a gear 76, and gear 72 drives a gear 74, these gears respectively driving the feed cams 44 and 46 previously referred to. The purpose of the present gear arrangement is to provide a space for the scoop wire 26 between the gears 74 and 76. It is for this reason that the gears 74 and 76 do not mesh directly together and instead are indirectly meshed through gears 70 and 72 which, being located well beneath the scoop wire 26, may be made large enough in diameter to mesh.

The scoop wire passes through an appropriate guide slot which is closed at the top by means of a T-shaped shoe 78 which is bolted in position, as is best shown in Fig. 7.

It will be evident from inspection of the drawings that the bearings for the gears 72 and 74 are held in position by means of a bearing cover 80, while the bearings for the gears 70 and 76 are held in position by means of a bearing cover 82. The bearing assembly is secured to the machine table, as by means of bolts 84.

Figure 2:
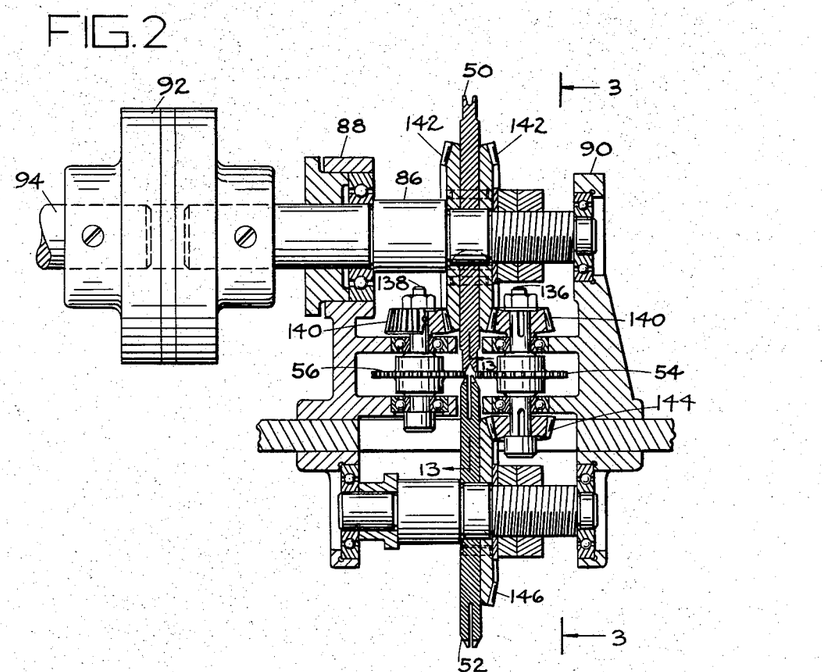
Fig. 2 is a section through a part of the machine, taken approximately in the plane of the line 2—2 of Figs. 1 and 3.

The severing wheel 50 may be described with reference to Figs. 2, and 8 through 13 of the drawings. In Fig. 2 it will be seen that the severing wheel 50 is secured to a shaft 86 carried in bearings 88 and 90, said shaft being connected by means of a suitable coupling 92 to a slow speed shaft 94 coming out of a gear housing 96 (Figs. 1 and 3). In Fig. 2, it will be noticed that the severing wheel 50 is peripherally grooved, and this groove, in the case here illustrated, conforms to the outline of the head of the scoop. This is best shown in Figs. 8 and 12.

The periphery of the severing wheel is slotted at the desired spacing or pitch of the scoops along the tape of the finished fastener. For convenience in machining, the innermost end of each slot is made of a separate insert 98 (Figs. 8, 9 and 10), the outer wall 99 of which is machined to conform to the head of a scoop before the insert is secured in place in the severing wheel.

Figure 10:
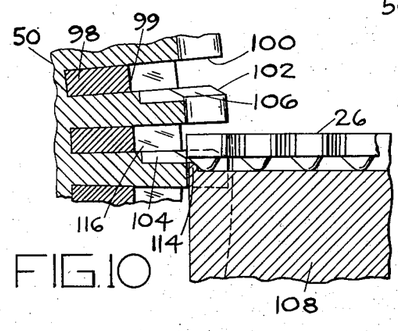
Fig. 10 is a fragmentary section drawn to enlarged scale, and taken approximately in the plane of the line 10—10 of Fig. 8.
Figure 14:
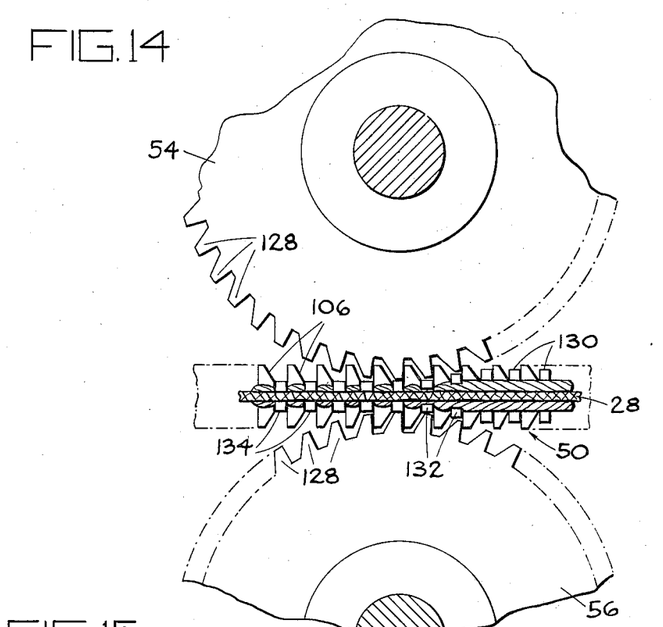
Fig. 14 is a bottom view of the clamping wheel and severing wheel with the tape stuffing wheel and other parts removed.

Referring to Fig. 10, the face 100 of the slot which pushes the endmost scoop past the severing die member, has a sharp or square cutting edge, whereas the opposite face is substantially beveled, as indicated at 102. This facilitates feed of the endmost scoop of the wire into the slot as the severing wheel rotates. The bottom face of the slot is also grooved or channeled, as is best shown at 104 in Fig. 8, to receive the projection of the scoop, the strip being fed to the machine with the projections downward and the recesses or pockets upward. The side edges of the bottom face of the slot are also beveled, as is indicated at 106 in Figs. 10 and 11, the purpose of this bing to facilitate meshing of the clamping wheels 54 and 56 with the slotted periphery of the severing wheel, as is best shown in Fig. 14.

Figure 8:
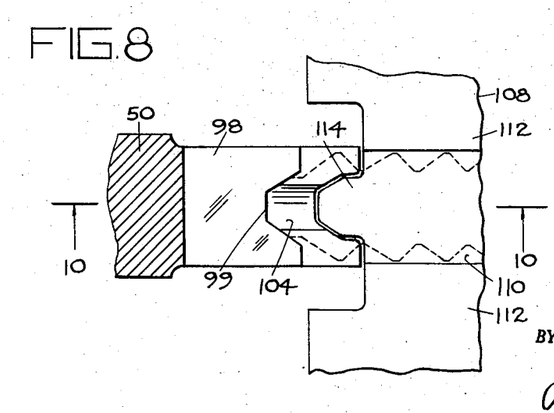
Fig. 8 is a partially sectioned plan view showing the cutting wheel and cooperating die, this view being taken approximately in the plane of the line 8—8 of Fig. 11, but with the scoop wire removed.
Figure 11:
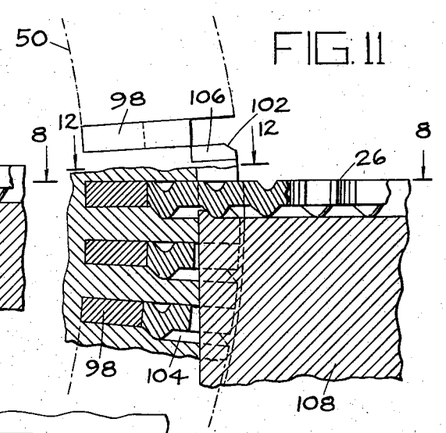
Fig. 11 is a similar view showing the relation of the parts as the scoop wire is fed all the way into the severing wheel.
Figure 12:
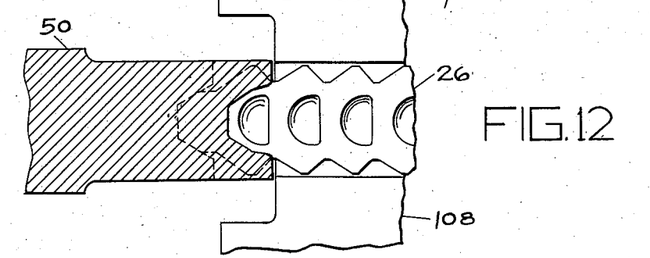
Fig. 12 is a horizontal section taken approximately in the plane of the line 12—12 of Fig. 11.
Figure 16:
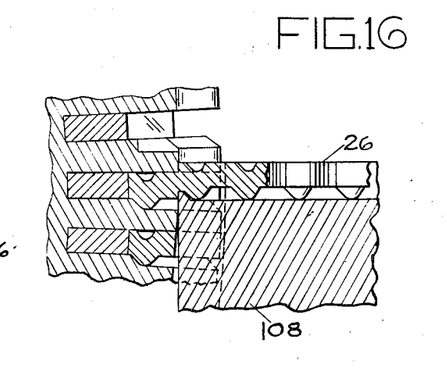
Fig. 16 is a section similar to Figs. 10 and 11, but showing the relation of the parts when the endmost scoop is partially severed from the scoop strip.

The stationary die with which the severing wheel cooperates, is shown in Figs. 8, 10 and 11. The die 108 is provided with a groove 110, bounded by ways 112. It has a projecting portion 114 which corresponds to the outline of the head of the scoop, and which supports the scoop wire when the endmost scoop is being severed. The manner in which this is done will be clear from a comparison of Figs. 10, 11 and 16, showing successive stages in the severing operation. In Fig. 10, the wire has not yet entered the slot 116 of the severing wheel, but is about to do so. In Fig. 11 one of the intermittent feed movements of the wire has taken place and it has been pushed home in the slot of the severing wheel. At this time the endmost scoop is received in the slot and the wire including the next to the endmost scoop, rests on the stationary die 108. Continued rotation of the wheel shears the scoop downward, as is best shown in Fig. 16.

Figure 9:
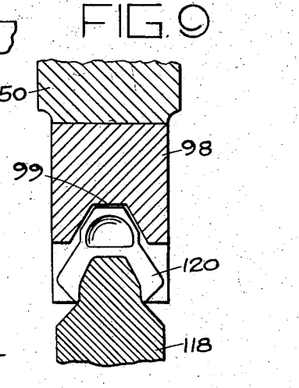
Fig. 9 is a section through the severing wheel, taken approximately in the plane of the line 9—9 of Fig. 3.

Cooperating with the die 108 and in some senses forming a continuation of it, is an arcuate guide 118 (Fig. 3) which fits between the jaws of the scoops and holds them in position in the wheel 50 until the scoops reach the tape. This action is best shown in Fig. 9, in which it will be seen that guide 118 enters between the spread jaws of the scoop 120 and serves to hold the latter against the insert 98 acting as the base of the slot receiving the scoop.

Figure 13:
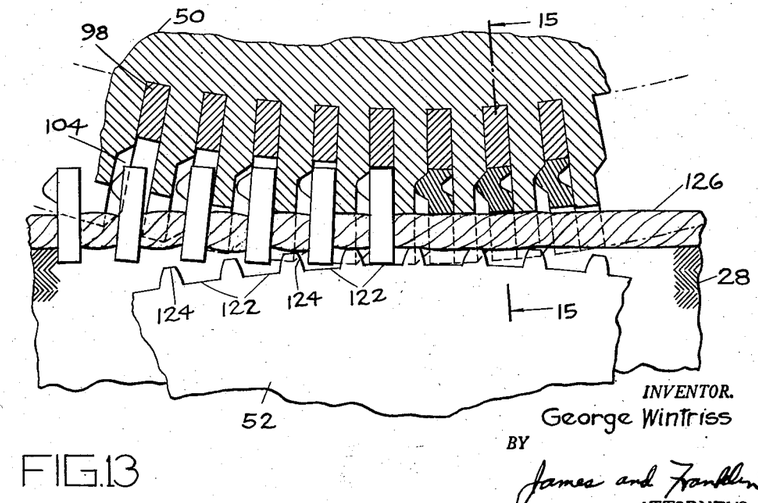
Fig. 13 is a vertical section drawn to enlarged scale, and taken approximately in the plane of the line 13—13 of Fig. 2.
Figure 15:
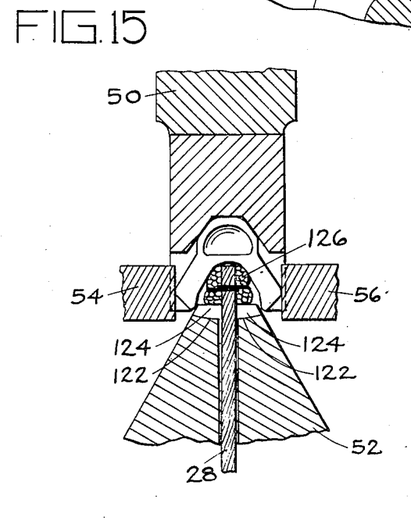
Fig. 15 is a section taken approximately in the plane of the line 15—15 of Fig. 13.

The tape stuffing wheel may be described with reference to Figs. 2, 13 and 15 of the drawings. Fig. 2 shows how the stuffing wheel 52 is circumferentially slit about its periphery to receive the web of the tape. Fig. 13 shows how the periphery of the stuffing wheel is transversely slotted at 122 to clear the ends of the jaws of the scoops. These slots 122 provide teeth 124 therebetween, which teeth bear upwardly against the beaded edge 126 of the tape and so hold it snugly within the jaw space of the scoops. Referring now to Fig. 15, the teeth bearing against the tape bead 126 are shown at 124, while the slots are indicated at 122. It should be observed that the surfaces 122 are so shaped and located as to rather accurately fit the ends of the jaws of the scoop as the jaws are closed by the clamping wheels 54 and 56. This helps maintain the scoop with its axis parallel to the plane of the tape, or in the present case, vertical.

The feature is important because, if due to faulty coining or severing of the scoop wire one jaw of the scoop is thicker than the other, there is ordinarily a tendency for the thin jaw to close first. Then, as the thicker jaw is closed, the scoop is biased on the tape. Moreover, the finished scoop has one jaw effectively longer than the other, which is of disadvantage for best cooperation with the slider of the fastener. With the support surfaces 122 shown in Fig. 15, the scoop is supported at the top by the severing wheel, at the bottom by the stuffing wheel, and at the sides by the clamping wheels. This so confines the scoop that it is properly located on the tape when the jaws are closed, regardless of any slight difference in the relative strength of the two jaws of the scoop.

The clamping wheels are best shown in Figs. 2 and 14 of the drawings. In Fig. 14, it will be seen that the wheels have teeth 128 so designed as to reach into the slots of the severing wheel in order to close the jaws of the scoop. Thus the first scoops 130 in Fig. 14 are still open; the scoops 132 are being closed; while the outgoing scoops 134 have already been closed on the tape. It will be noted that the teeth 128 are sloped on one side to better mesh with the teeth of the severing wheel, and that the latter are provided with cooperating bevels 106. These are the side bevels 106 previously referred to in connection with Figs. 10 and 11.

Referring to Fig. 2, the clamping wheels 54 and 56 are carried on shafts 136 and 138 respectively. These are provided with bevel pinions 140 meshing with bevel gears 142 secured directly to the severing wheel 50. Thus slow speed shaft 94 drives the severing wheel 50, and, through the bevel gears, drives the clamping wheels 54 and 56. It will be understood that these wheels are driven in tooth for tooth synchronism, and that the difference in diameter between the bevel gears 142 and the bevel pinions 140, simply corresponds to the difference in diameter between the severing wheel 50 and the clamping wheels 54 and 56.

In Fig. 2 it will be noted that the shaft 136 is extended downwardly and carries another bevel pinion 144 meshing with a bevel gear 146 secured to the tape stuffing wheel 52. Here again it will be understood that the reduction ratio between the bevel pinion 144 and bevel gear 146 corresponds to the difference in diameter between the clamping wheels and the tape stuffing wheel. In the particular case here shown, the tape stuffing wheel is of the same diameter as the severing wheel 50, hence the step-down ratio of the lower bevel gears is the same as the step-up ratio of the upper bevel gears.

As so far described, the tape will be fed through the machine because of the action of the severing wheel on the scoops already clamped onto the tape. However, it is preferred to supplement the tape feed. For this purpose, additional tape feed wheels 58 (Fig. 3) are provided. These bear against the sides of the tape, there being two wheels, only one of which is shown in Fig. 3. The upper ends of the wheels may be toothed to mesh with the scoops on the tape, or may be simply reduced in diameter to clear the scoops. The feed of wheels 58 is preferably simply frictional, and these wheels serve merely to keep the tape under tension, the precise speed of movement of the tape being controlled by retention of the clamped scoops in the slots of the tape severing wheel. The drive for wheels 58 is not shown. Gearing may be used for a positive drive, or belts for a frictional drive.

If desired, the rolls 58 may be used also as finishing rolls, to help finish the stringer by rolling the elements to proper width and smoothness.

The reduction gearing in the gear box 96 may be of any conventional character suited to obtaining a reduction ratio such as to advance the scoop wire one scoop for each slot in the severing wheel.

It is believed that the construction and operation, as well as the advantages of the present improved scoop machine, will be apparent from the foregoing detailed description. The machine employs only rotary motions, and all of the rotating parts turn at uniform speed. Thus the machine is capable of very high speed operation in a relatively smooth and quiet manner, because of the absence of reciprocating parts and resulting inertia effects.

It will be understood that while the machine has been described as operating on a preferred form of scoop wire for making a particular kind of scoop, it may be used with a scoop wire producing a different kind of scoop. It will also be understood that some features of the invention may be used without others. For example, the rotary severing wheel and stuffing wheel may be employed with reciprocating clamping blades, although without the full advantage of the present invention, in which all parts are rotary.

It will therefore be apparent that while the invention has been described in a preferred form, many changes may be made without departing from the spirit of the invention as sought to be defined in the following claims. In the claims, the term "scoop" is used synonymously with the term "fastener element," even though many kinds of fastener elements are known which are not shaped like a scoop.

What is claimed is:

1. In apparatus for manufacturing slide fasteners, means for severing scoops from a scoop strip and for transferring said severed scoops directly to the beaded edge of a tape and for spacing said scoops at desired pitch along said tape, said means comprising a severing wheel the periphery of which is slotted at the desired scoop pitch and a stationary die member disposed at the periphery of said severing wheel, said die member being shaped to conform to the outline of the scoop, said severing wheel having a section of mating outline, and the slots being dimensioned to receive the endmost scoop of the strip, whereby on rotation of said severing wheel the endmost scoop is severed from the strip, and tape support means for holding the beaded edge of the tape at the periphery of the wheel between the jaws of the severed scoops.

2. In apparatus for manufacturing slide fasteners, means for severing scoops from a scoop strip having the head of each embryo scoop nested between the jaws of the next preceding embryo scoop, and for transferring said severed scoops directly to the beaded edge of a tape, said means comprising a severing wheel the periphery of which is radially slotted and a stationary die member disposed at the periphery of said severing wheel, said die member being shaped to conform to the outline of the head of the scoop, said severing wheel being peripherally grooved to mating outline, said radial slots being dimensioned to receive the endmost scoop of the strip, whereby on rotation of said severing wheel the endmost scoop is severed from the strip, and tape support means for holding the beaded edge of the tape in the grooved periphery of the wheel between the jaws of the severed scoops.

3. In apparatus for manufacturing slide fasteners, means for severing scoops from a scoop strip having the head of each embryo scoop nested between the spread jaws of the next preceding embryo scoop, and for transferring said severed scoops directly to the beaded edge of a tape, and for spacing said scoops at desired pitch along said tape, said means comprising a severing wheel the periphery of which is slotted at the desired pitch and a stationary die member disposed at the periphery of said severing wheel, said die member being shaped to conform to the outline of the head of the scoop, said severing wheel being peripherally grooved to mating outline, said slots being dimensioned and appropriately shaped to receive the endmost scoop of the strip, whereby on rotation of said severing wheel the endmost scoop is severed from the strip, and tape support means for holding the beaded edge of the tape in the grooved periphery of the wheel between the jaws of the severed scoops.

4. In apparatus for manufacturing slide fasteners, means for severing scoops from a scoop strip, said means comprising a severing wheel the periphery of which is slotted and a stationary die member disposed at the periphery of said severing wheel, said die member being shaped to conform to the outline of the scoop, the periphery of said severing wheel having a mating section, and the slots being dimensioned to receive the endmost scoop of the strip, whereby on rotation of said severing wheel the endmost scoop is severed from the strip, the face of the slot which pushes the endmost scoop past the stationary die member having a sharp or square cutting edge, and the opposite face being substantially beveled.

5. In apparatus for manufacturing slide fasteners, means for severing scoops from a scoop strip having the head of each embryo scoop nested between the spread jaws of the next preceding embryo scoop, said means comprising a severing wheel the periphery of which is slotted and a stationary die member disposed at the periphery of said severing wheel, said die member being shaped to conform to the outline of the head of a scoop, said severing wheel being peripherally grooved to mating outline, and the slots being dimensioned and appropriately shaped to receive the endmost scoop of the strip, whereby on rotation of said severing wheel the endmost scoop is severed from the strip, the inner end of each slot being made of a separate insert the outer wall of which is machined to conform to the head of a scoop.

6. In apparatus for manufacturing slide fasteners, means for severing scoops from a scoop strip having the head of each embryo scoop nested between the jaws of the next preceding embryo scoop, said means comprising a severing wheel the periphery of which is radially slotted and a stationary die member disposed at the periphery of said severing wheel, said die member being shaped to conform to the outline of the head of a scoop, said severing wheel being peripherally grooved to mating outline, and the radial slots being dimensioned and appropriately shaped to receive the endmost scoop of the strip, whereby on rotation of said severing wheel the endmost scoop is severed from the strip, the face of the slot which pushes the endmost scoop past the stationary die member having a sharp or square cutting edge, the opposite face being beveled, the inner end of each slot being made of a separate insert the outer wall of which is machined to conform to the head of the scoop.

7. In apparatus for manufacturing slide fasteners, means for assembling scoops on a tape, said means including a tape stuffing wheel having a circumferentially slit periphery for receiving the web of the tape, the periphery of said wheel being transversely slotted to clear the jaws of scoops and providing teeth between said jaws for bearing against the beaded edge of the tape and holding it snugly within the jaw space of the scoops, a scoop transfer and spacing wheel the periphery of which is radially slotted to receive and transfer scoops to the tape at proper pitch or spacing along the tape, and additional means located adjacent the tape stuffing wheel and the scoop transfer and spacing wheel to clamp the jaws of the scoops against the beaded edge of the tape while the scoops are supported between the transfer wheel and the tape.

8. In apparatus for manufacturing slide fasteners, means for assembling scoops on a tape, said means including a tape stuffing wheel having a circumferentially slit periphery for receiving the web of the tape, the periphery of said wheel being transversely slotted to clear the jaws of scoops and providing teeth between said jaws for bearing against the beaded edge of the tape and holding it snugly within the jaw space of the scoops, the periphery of said stuffing wheel between said teeth being so shaped and dimensioned as to support the ends of the jaws as the jaws are closed, thereby helping maintain the axis of the scoop parallel to the plane of the tape, a scoop transfer and spacing wheel the periphery of which is slotted to receive and transfer scoops to the tape at proper pitch or spacing along the tape, and additional means located adjacent the tape stuffing wheel and the scoop transfer and spacing wheel to clamp the jaws of the scoops against the beaded edge of the tape while the scoops are supported between the transfer wheel and the stuffing wheel.

9. In apparatus for maunfacturing slide fasteners, means for applying scoops to a tape comprising a tape stuffing wheel having a circumferentially slit periphery for receiving the web of the tape, the periphery of said wheel being transversely slotted to clear the jaws of scoops and providing teeth between said jaws for bearing against the beaded edge of the tape and holding it snugly within the jaw space of the scoops, a transfer and spacing wheel having its periphery radially slotted to receive scoops and to transfer the same to the beaded edge of the tape at the desired pitch or spacing, and clamping wheels on opposite sides of the tape and the transfer wheel for clamping the jaws of the scoops against the beaded edge of the tape, said clamping wheels being perpiherally toothed to mesh in the radial slots of the transfer wheel.

10. In apparatus for manufacturing slide fasteners, means for severing scoops from a scoop strip and for transferring said severed scoops directly to the beaded edge of a tape, said means comprising a severing wheel the periphery of which is slotted, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, and a tape stuffing wheel for holding the beaded edge of the tape in the grooved periphery of the wheel between the jaws of the severed scoops, said tape stuffing wheel having a circumferentially slit periphery for receiving the web of the tape, the periphery of said wheel being shaped to clear the jaws of scoops and to bear against the beaded edge of the tape and to hold it within the jaw space of the scoops.

11. In apparatus for manufacturing slide fasteners, means for severing scoops from a scoop strip and for transferring said severed scoops directly to the beaded edge of a tape and for spacing said scoops at desired pitch along said tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the wire, and a tape stuffing wheel for holding the beaded edge of the tape in the grooved periphery of the wheel between the jaws of the severed scoops, said tape stuffing wheel having a circumferentially slit periphery for receiving the web of the tape, the periphery of said wheel being transversely slotted to clear the jaws of scoops and providing teeth between said jaws for bearing against the beaded edge of the tape and holding it within the jaw space of the scoops.

12. In apparatus for manufacturing slide fasteners, means for severing scoops from a scoop strip having the head of each embryo scoop nested between the spread jaws of the next preceding embryo scoop, and for transferring said severed scoops directly to the beaded edge of a tape and for spacing said scoops at desired pitch or spacing along said tape, said means comprising a severing wheel the periphery of which is radially slotted at the desired pitch, a stationary die member disposed at the periphery of said severing wheel, said die member being shaped to conform to the outline of the head of the scoop, said severing wheel being peripherally grooved to mating outline, and the radial slots being dimensioned and appropriately shaped to receive the endmost scoop of the strip, whereby on rotation of said severing wheel the endmost scoop is severed from the strip, and a tape stuffing wheel for holding the beaded edge of the tape in the grooved periphery of the wheel between the jaws of the severed scoops, said tape stuffing wheel having a circumferentially slit periphery for receiving the web of the tape, the periphery of said wheel being transversely slotted to clear the jaws of scoops and providing teeth between said jaws for bearing against the beaded edge of the tape and holding it within the jaw space of the scoops, the periphery of said stuffing wheel between said teeth being so shaped and dimensioned as to support the ends of the scoop jaws, thereby helping maintain the axis of the scoop parallel to the plane of the tape.

13. In apparatus for manufacturing slide fasteners, means for severing scoops from a scoop strip and for transferring said severed scoops directly to the beaded edge of a tape, and for clamping said scoops at desired pitch along the tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, tape support means for holding the beaded edge of the tape in the grooved periphery of the wheel between the jaws of the severed scoops, and clamping wheels on opposite sides of the tape and the severing wheel for clamping the jaws of the scoops against the beaded edge of the tape.

14. In apparatus for manufacturing slide fasteners, means for severing scoops from a scoop strip and for transferring said severed scoops directly to the beaded edge of a tape and for clamping said scoops at desired pitch along said tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, tape support means for holding the beaded edge of the tape in the grooved periphery of the wheel between the jaws of the severed scoops, and clamping wheels on opposite sides of the tape and the severing wheel for clamping the jaws of the scoops against the beaded edge of the tape, said clamping wheels being peripherally toothed to mesh in the slots of the severing wheel.

15. In apparatus for manufacturing slide fasteners, means for severing scoops from a scoop strip having the head of each embryo scoop nested between the spread jaws of the next preceding embryo scoop, and for transferring said severed scoops directly to the beaded edge of a tape and for clamping said scoops at desired pitch or spacing along said tape, said means comprising a severing wheel, the periphery of which is radially slotted at the desired pitch, a stationary die member disposed at the periphery of said severing wheel, said die member being shaped to conform to the outline of the head of the scoop, said severing wheel being peripherally grooved to mating outline, and the radial slots being dimensioned and appropriately shaped to receive the endmost scoop of the strip, whereby on rotation of said severing wheel the endmost scoop is severed from the strip, tape support means for holding the beaded edge of the tape in the grooved periphery of the wheel between the jaws of the severed scoops, and clamping wheels on opposite sides of the tape and severing wheel for clamping the jaws of the scoops against the beaded edge of the tape, said clamping wheels being peripherally toothed to mesh in the radial slots of the severing wheel, said teeth and slots being so beveled as to facilitate the desired meshing action as the three wheels rotate.

16. In apparatus for manufacturing slide fasteners, means for severing scoops from a scoop strip having serrated side edges, said means comprising a severing wheel the periphery of which is slotted, and a stationary die member disposed at the periphery of said severing wheel, said die member being shaped to conform to the outline of the scoop, said severing wheel being peripherally grooved to mating outline, and the slots being dimensioned to receive the endmost scoop of the strip, whereby on rotation of said severing wheel the endmost scoop is severed from the strip, and continuously rotating means for intermittently feeding the scoop wire to said severing wheel, said feed means comprising cams engaging opposite edges of the wire, said cams having helical portions for advancing the wire and straight portions for causing the wire to dwell, and appropriate gearing for rotating the cams in properly timed relation to the severing wheel.

17. In apparatus for manufacturing slide fasteners, means for severing scoops from a scoop strip having serrated side edges, said means comprising a severing wheel the periphery of which is slotted, and a stationary die member disposed at the periphery of said severing wheel, said die member being shaped to conform to the outline of the head of that scoop, said severing wheel being peripherally grooved to mating outline, and the slots being dimensioned to receive the endmost scoop of the strip, whereby on rotation of said severing wheel the endmost scoop is severed from the strip, and continuously rotating means for intermittently feeding the scoop wire to said severing wheel, said feed means comprising cams engaging opposite edges of the wire, each of said feed cams having helical portions for advancing the wire and straight portions for causing the wire to dwell, there being a plurality of helical and straight portions around the periphery of the cam so that each revolution of the cam causes a plurality of intermittent feed movements of the wire, and appropriate gearing for rotating the cams in properly timed relation to the severing wheel.

18. In apparatus for manufacturing slide fasteners, means for severing scoops from a scoop strip having the head of each embryo scoop nested between the spread jaws of the next preceding embryo scoop, and having serrated side edges corresponding to the ends of the spread jaws, said means comprising a severing wheel the periphery of which is slotted, and a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, and continuously rotating means for intermittently feeding the scoop wire to said severing wheel, said feed means comprising cams engaging opposite edges of the wire, said feed cams having helical portions for advancing the wire and straight portions for causing the wire to dwell, there being a plurality of helical and straight portions around the periphery of the cam so that each revolution of the cam causes a plurality of intermittent feed movements of the wire, and appropriate gearing for rotating the cams in properly timed relation to the severing wheel.

19. In apparatus for manufacturing slide fasteners, means for severing scoops from a scoop strip having serrated side edges and for transferring the severed scoops directly to the beaded edge of a tape, and for spacing said scoops at desired pitch along said tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, and tape support means for holding the beaded edge of the tape in the grooved periphery of the wheel between the jaws of the severed scoops, said tape support means including a tape stuffing wheel having a circumferentially slit periphery for receiving the web of the tape, the periphery of said wheel being transversely slotted to clear the jaws of scoops and providing teeth between said jaws for bearing against the beaded edge of the tape and holding it within the jaw space of the scoops, and a continuously rotating feed cam for intermittently feeding the scoop wire to said severing wheel, said feed means comprising feed cams engaging opposite edges of the wire, said feed cams having helical portions for advancing the wire and straight portions for causing the wire to dwell, and appropriate gearing for rotating the cams in properly timed relation to the severing wheel.

20. In apparatus for manufacturing slide fasteners, means for severing scoops from a scoop strip having the head of each embryo scoop nested between the spread jaws of the next preceding embryo scoop, and having serrated side edges corresponding to the ends of the spread jaws, and for transferring said severed scoops directly to the beaded edge of a tape and for spacing said scoops at desired pitch along said tape, said means comprising a severing wheel the periphery of which is radially slotted at the desired pitch, a stationary die member disposed at the periphery of said severing wheel, said die member being shaped to conform to the outline of the head of the scoop, said severing wheel being peripherally grooved to mating outline, and the radial slots being dimensioned to receive the endmost scoop of the strip, whereby on rotation of said severing wheel the endmost scoop is severed from the strip, and tape support means for holding the beaded edge of the tape in the grooved periphery of the wheel between the jaws of the severed scoops, said tape support means including a tape stuffing wheel having a circumferentially slit periphery for receiving the web of the tape, the periphery of said wheel being transversely slotted to clear the jaws of scoops and providing teeth between said jaws for bearing against the beaded edge of the tape and holding it within the jaw space of the scoops, the periphery of said stuffing wheel between said teeth being so shaped and dimensioned as to help support the ends of the jaws as the jaws are closed, thereby helping maintain the axis of the scoop parallel to the plane of the tape, and continuously rotating means for intermittently feeding the scoop wire to said severing wheel, said feed means comprising feed cams engaging opposite edges of the wire, said feed cams having helical portions for advancing the wire and straight portions for causing the wire to dwell, there being a plurality of helical and straight portions around the periphery of the cam so that each revolution of the cam causes a plurality of intermittent feed movements of the wire, and appropriate gearing for rotating the cams in properly timed relation to the severing wheel.

21. In apparatus for manufacturing slide fasteners, means for severing scoops from a scoop strip having serrated side edges, and for transferring said severed scoops directly to the beaded edge of a tape, and for spacing said scoops at desired pitch along said tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, tape support means for holding the beaded edge of the tape in the grooved periphery of the wheel between the jaws of the severed scoops, clamping wheels on opposite sides of the tape and the severing wheel for clamping the jaws of the scoops against the beaded edge of the tape, said clamping wheels being peripherally toothed to mesh in the radial slots of the severing wheel, a continuously rotating feed cam for intermittently feeding the scoop wire to said severing wheel, said feed cam having a helical portion for advancing the wire and a straight portion for causing the wire to dwell, and appropriate gearing for rotating the cam and severing wheel and clamping wheels in properly timed relation.

22. In apparatus for manufacturing slide fasteners, means for severing scoops from a scoop strip having the head of each embryo scoop nested between the spread jaws of the next preceding embryo scoop, and having serrated side edges corresponding to the ends of the spread jaws, and for transferring the severed scoops directly to the beaded edge of a tape and for clamping said scoops at desired pitch along said tape, said means comprising a severing wheel the periphery of which is slotted at the desired pitch, a stationary die member disposed at the periphery of said severing wheel, said die member being shaped to conform to the outline of the head of the scoop, said severing wheel being peripherally grooved to mating outline, and the slots being dimensioned to receive the endmost scoop of the strip, whereby on rotation of said severing wheel the endmost scoop is severed from the strip, tape support means for holding the beaded edge of the tape in the grooved periphery of the wheel between the jaws of the severed scoops, clamping wheels on opposite sides of the tape and the transfer wheel for clamping the jaws of the scoops against the beaded edge of the tape, said clamping wheels being peripherally toothed to mesh in the slots of the transfer wheel, said teeth and slots being so beveled as to facilitate the desired meshing action as the three wheels rotate, a continuously rotating feed cam for intermittently feeding the scoop wire to said severing wheel, said feed cam having a helical portion for advancing the wire and a straight portion for causing the wire to dwell, and appropriate gearing for rotating the cam and severing wheel and clamping wheels in properly timed relation.

23. An apparatus for manufacturing slide fasteners from a scoop strip having a serrated edge, said apparatus comprising a continuously rotatable feed cam engaging the serrated edge of the strip, a continuously rotating severing wheel cooperating with a stationary die surface and slotted to receive and sever the endmost scoop from the strip and to transfer the same to a tape, means for supporting the tape between the spread jaws of the scoops, continuously rotating clamping wheels having clamping teeth meshing with the severing wheel and engaging the spread jaws to clamp the same against the tape, and appropriate gearing interconnecting all of said continuously rotating means to rotate the same in properly timed relation.

24. An apparatus for manufacturing slide fasteners from a scoop strip having the head of each embryo scoop nested between the spread jaws of the next preceding embryo scoop, and having serrated side edges corresponding to the ends of the spread jaws, said apparatus comprising continuously rotatable feed cams engaging the serrated edges of the strip, a continuously rotating severing wheel cooperating with a stationary die surface and slotted to receive and sever the endmost scoop from the strip and to transfer the same to a tape, a continuously rotating stuffing wheel having a circumferentially slit periphery for receiving and supporting the tape between the spread jaws of the scoops, continuously rotating clamping wheels having clamping teeth meshing with the severing and stuffing wheels and engaging the spread jaws to clamp the same against the tape, and appropriate gearing interconnecting all of said continuously rotating means to rotate the same in properly timed relation.

25. An apparatus for manufacturing slide fasteners from a scoop strip having the head of each embryo scoop nested between the spread jaws of the next preceding embryo scoop, and having serrated side edges corresponding to the ends of the spread jaws, said apparatus comprising a continuously rotatable feed cam engaging the serrated edge of the strip, a continuously rotating severing wheel cooperating with a stationary die surface and slotted to receive and sever the endmost scoop from the strip and to transfer the same to a tape, a continuously rotating stuffing wheel having a circumferentially slit periphery for receiving and supporting the tape between the spread jaws of the scoops, continuously rotating clamping wheels having clamping teeth meshing with the severing and stuffing wheels and engaging the spread jaws to clamp the same against the tape, additional continuously rotating feed wheels engaging the finished stringer to keep the same under tension, and appropriate gearing interconnecting all of said continuously rotating 26. In apparatus for manufacturing slide fasteners from scoop wire comprising embryo scoops arranged end to end and with a side edge of said wire serrated, said apparatus comprising means for severing individual scoops from the scoop wire, continuously rotating means for intermittently feeding said scoop wire to the severing means, said feed means comprising a feed cam disposed with its axis extending generally parallel to the direction of feed of the scoop wire toward the severing means, said cam having a cam surface for engaging a serration of the wire, means for retaining said wire against said feed cam, said cam surface having a helical portion for advancing the wire and a straight portion for causing the wire to dwell during the severing operation.

27. In apparatus for manufacturing slide fasteners from scoop wire comprising embryo scoops arranged end to end and with the side edges of said wire serrated, said apparatus comprising means for severing individual scoops from the scoop wire, continuously rotating means for intermittently feeding said scoop wire to the severing means, said feed means comprising feed cams engaging opposite edges of the wire and disposed with their axes extending generally parallel to the direction of feed of the scoop wire toward the severing means, each of said cams having a cam surface for engaging a serration of the wire, said cam surfaces having a helical portion for advancing the wire and a straight portion for causing the wire to dwell during the severing operation.

28. In apparatus for manufacturing slide fasteners from scoop wire comprising embryo scoops arranged end to end and with a side edge of said wire serrated, said apparatus comprising means for severing individual scoops from the scoop wire, continuously rotating means for intermittently feeding said scoop wire to the severing means, said feed means comprising a feed cam disposed with its axis extending generally parallel to the direction of feed of the scoop wire toward the severing means, said cam having multiple cam surfaces for engaging multiple serrations of the wire, means for retaining said wire against said feed cam, said cam having helical portions for advancing the wire and straight portions for causing the wire to dwell during the severing operation.

29. In apparatus for manufacturing slide fasteners from scoop wire comprising embryo scoops arranged end to end and with the side edges of said wire serrated, said apparatus comprising means for severing individual scoops from the scoop wire, continuously rotating means for intermittently feeding said scoop wire to the severing means, said feed means comprising feed cams engaging opposite edges of the wire and disposed with their axes extending generally parallel to the direction of feed of the scoop wire toward the severing means, each of said cams having multiple cam surfaces for engaging multiple serrations of the wire, said cam surfaces having helical portions for advancing the wire and straight portions for causing the wire to dwell during the severing operation.

GEORGE WINTRISS.

REFERENCES CITED

The following references are of record in the file of this patent:

UNITED STATES PATENTS

| Number | Name | Date |
| --- | --- | --- |
| 1,890,300 | Nagele | Dec. 6, 1932 |
| 2,070,902 | Himan | Feb. 16, 1937 |
| 2,071,603 | Winterhalter | Feb. 23, 1937 |
| 2,087,461 | Wittenberg | July 20, 1937 |
| 2,094,715 | Nagele | Oct. 5, 1937 |
| 2,261,552 | Koppel | Nov. 4, 1941 |
| 2,275,769 | Kiessling | Mar. 10, 1942 |
| 2,294,763 | Reiter | Sept. 1, 1942 |
| 2,335,034 | Winterhalter | Nov. 23, 1943 |
| 2,396,933 | Voity | Mar. 19, 1946 |

FOREIGN PATENTS

| Number | Country | Date |
| --- | --- | --- |
| 143,086 | Australia | Oct. 10, 1935 |
| 246,365 | Germany | May 25, 1911 |
| 308,330 | Germany | July 7, 1917 |